United States Patent
Bartko

(10) Patent No.: US 10,732,255 B2
(45) Date of Patent: Aug. 4, 2020

(54) METHOD AND APPARATUS FOR DETECTION OF A SIGNAL

(71) Applicant: Rohde & Schwarz GmbH & Co. KG, München (DE)

(72) Inventor: Hendrik Bartko, Unterhaching (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 396 days.

(21) Appl. No.: 15/652,990

(22) Filed: Jul. 18, 2017

(65) Prior Publication Data
US 2018/0059206 A1    Mar. 1, 2018

(30) Foreign Application Priority Data
Aug. 31, 2016 (EP) ..................................... 16186478

(51) Int. Cl.
*G01S 3/74* (2006.01)
*G01S 3/14* (2006.01)

(52) U.S. Cl.
CPC . *G01S 3/74* (2013.01); *G01S 3/14* (2013.01)

(58) Field of Classification Search
CPC .............................. G01S 3/74; G01S 3/00–789
See application file for complete search history.

(56) References Cited

U.S. PATENT DOCUMENTS

| | | | | |
|---|---|---|---|---|
| 4,163,978 A * | 8/1979 | Shepherd | ................... | G01S 3/66 342/440 |
| 5,854,601 A * | 12/1998 | Kenefic | ................... | G01S 7/021 342/13 |
| 5,943,013 A * | 8/1999 | Ohashi | ..................... | G01S 3/14 342/417 |
| 7,427,954 B2 * | 9/2008 | Vaughn, Jr. | .............. | G01S 3/74 342/444 |
| 7,477,192 B1 * | 1/2009 | Haff | ......................... | G01S 3/30 342/374 |
| 9,696,412 B2 * | 7/2017 | Kanter | .................. | G01S 7/4865 |
| 10,175,335 B1 * | 1/2019 | Stefanakis | ............. | G01S 3/802 |
| 2007/0222672 A1 * | 9/2007 | Hjelmstad | .............. | G01S 3/023 342/147 |
| 2010/0073216 A1 | 3/2010 | Sakamoto et al. | | |
| 2010/0283666 A1 * | 11/2010 | Lee | .......................... | G01S 3/74 342/175 |
| 2011/0264447 A1 | 10/2011 | Visser et al. | | |

OTHER PUBLICATIONS

MIT Introduction to EECS II Digital Communication Systems 6.02 Spring 2012 Lecture #8 (Year: 2012).*
Saucier, Norman and Struckman, Keith, "Direction Finding Using Correlation Techniques", 1975, published in 1975 Antennas and Propagation Society International Symposium (Year: 1975).*
European Search Report from European Patent Application No. 16186478.0, dated Mar. 27, 2017, 5 pages.

* cited by examiner

*Primary Examiner* — Cassi J Galt
(74) *Attorney, Agent, or Firm* — Westman, Champlin & Koehler, P.A.

(57) ABSTRACT

The present application is related to a method for detection of a signal, the method comprising the steps of performing continuously a direction finding in time-frequency intervals within a time range and a frequency range, determining for each frequency interval a distribution of the direction finding results, DFRs, for all time intervals and evaluating the determined distribution of direction finding results, DFRs, to detect the existence of a signal emitted by a signal source.

19 Claims, 3 Drawing Sheets

METHOD AND APPARATUS FOR DETECTION OF A SIGNAL

CROSS-REFERENCE TO RELATED APPLICATIONS

This application is a non-provisional application of European Application No. 16186478.0, filed on Aug. 31, 2016 the contents of which is hereby incorporated in its entirety.

FIELD OF THE INVENTION

The invention relates to a method and apparatus for detection of a signal emitted by a signal source.

TECHNICAL BACKGROUND

While direction finding for navigation purposes is becoming less important due to the availability of satellite navigation systems there is a growing demand for determining the location of emitters or signal sources. Before a direction finding method can be applied, it is necessary to detect the existence of a signal emitted by a signal source. The received signals can be extreme weak signals or special signals which have been intentionally generated with characteristics which make the detection of the signals difficult. These kind of special signals are often referred to as low probability of intercept signals.

Accordingly, there is a need for efficient detection of a weak signal or a low probability of intercept signal.

SUMMARY OF THE INVENTION

The invention provides according to a first aspect a method for detection of a signal, the method comprising the steps of: performing continuously a direction finding in time-frequency intervals within a time range and a frequency range, determining for each frequency interval a distribution of the direction finding results for all time intervals and evaluating the determined distribution of direction finding results to detect the existence of a signal emitted by a signal source.

In a possible embodiment of the method according to the first aspect of the present invention, a bearing of the signal source having emitted the detected signal is determined on the basis of the direction finding results.

In a possible embodiment of the method according to the first aspect of the present invention, a frequency range to be searched is divided into a number of frequency intervals and a time range to be searched is also divided into a number of time intervals.

In a further possible embodiment of the method according to the first aspect of the present invention, for each of the number of frequency intervals a distribution of the direction finding results of the number of time intervals is determined.

In a possible embodiment of the method according to the first aspect of the present invention, a direction finding range of 360° is divided into a number of angle intervals.

In a still further possible embodiment of the method according to the first aspect of the present invention, the frequency intervals, the time intervals and/or the angle intervals are formed by equidistant intervals.

In a still further possible embodiment of the method according to the first aspect of the present invention, the distribution of direction finding results is formed by a histogram indicating for each of the number of angle intervals a number of direction finding results falling in the respective angle interval.

In a further possible embodiment of the method according to the first aspect of the present invention, the angle intervals comprise intervals of an azimuth angle and/or an elevation angle.

In a still further possible embodiment of the method according to the first aspect of the present invention, a specific angle interval having a maximal number of direction finding results falling into the specific angle interval is determined.

In a still further possible embodiment of the method according to the first aspect of the present invention, an average value A of the number of direction finding results, DFRs, in the remaining, B−1, angle intervals b is calculated as follows:

$$A = \frac{M - R_{MAX}}{B - 1},$$

wherein M is the number of time intervals,
$R_{MAX}$ is the maximal number of direction finding results falling into a specific angle interval $b_{max}$,
B is the number of angle intervals b.

In a possible embodiment of the method according to the first aspect of the present invention, a probability that the maximal number of direction finding results in the specific angle interval does not originate from noise is calculated as follows:

$$P = \frac{1 - 0,5\left(\left(\operatorname{erf}(R_{max} - A)/\sqrt{A}\,/\sqrt{2}\right) + 1\right)}{B - 1}$$

wherein erf(x) is the error function of x,
$R_{MAX}$ is a maximal number of direction finding results falling into a specific angle interval,
A is the calculated average value and
B is the number of angle intervals b.

In a possible embodiment of the method according to the first aspect of the present invention, the existence of a signal emitted by a signal source is detected if the calculated probability exceeds a predetermined threshold.

In a possible embodiment of the method according to the first aspect of the present invention, the signal comprises a low probability of intercept, LPI, signal.

In a still further possible embodiment of the method according to the first aspect of the present invention, the signal comprises a control signal adapted to control a movable object.

In a still further possible embodiment of the method according to the first aspect of the present invention, the signal comprises a radar signal adapted to detect an object.

In a further possible embodiment of the method according to the first aspect of the present invention, if the existence of a signal emitted by a signal source is detected the determined distribution of direction finding results is displayed to a user.

In a still further possible embodiment of the method according to the first aspect of the present invention, if the existence of a signal emitted by a signal source is detected a warning signal is generated automatically.

In a still further possible embodiment of the method according to the first aspect of the present invention, if the existence of a signal emitted by a signal source is detected countermeasures against the emitted signal and/or against the signal source are automatically initiated.

The invention provides according to a second aspect an apparatus for detection of a signal emitted by a signal source, said apparatus comprising: a direction finding unit adapted to perform continuously a direction finding in time-frequency intervals within a time range and a frequency range and a processing unit being adapted to determine for each frequency interval a distribution of direction finding results for all time intervals and being adapted to evaluate the determined distribution of direction finding results to detect the existence of a signal emitted by a signal source.

In the following, possible embodiments of the different aspects of the present invention are described in detail with reference to the enclosed figures.

CONTENTS OF THE DRAWINGS

The present invention is described in greater detail in the following on the basis of the embodiments shown in the schematic figures of the drawings, in which.

Figure 1:
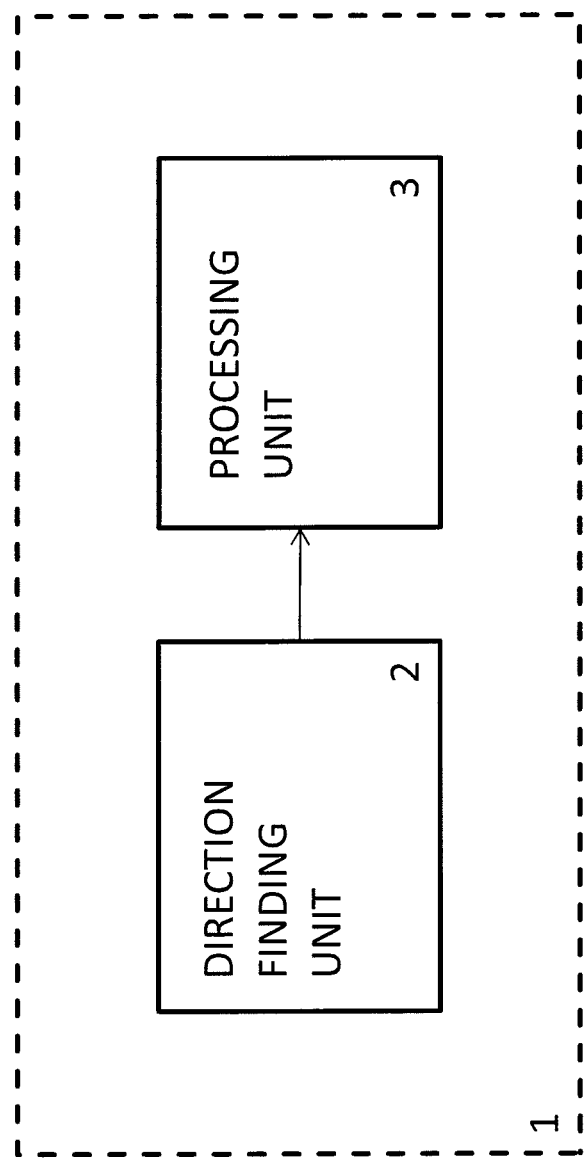
FIG. 1 shows a block diagram for illustrating a possible exemplary embodiment of an apparatus for detection of a signal emitted by a signal source according to an aspect of the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

DESCRIPTION OF EMBODIMENTS

As can be seen in the block diagram of FIG. 1, the apparatus 1 for detection of a signal emitted by a signal source comprises two main subunits. These subunits comprise a direction finding unit 2 and a processing unit 3. The direction finding unit 2 is adapted to perform continuously a direction finding in time-frequency intervals $[t_i; t_j]$ $[f_k; f_l]$ within a time range and a frequency range.

The processing unit 3 of the apparatus 1 is adapted to determine for each frequency interval $[f_k; f_l]$ a distribution of direction finding results DFRs for all time intervals $[t_i; t_j]$ and is further adapted to evaluate the determined distribution of direction finding results DFRs to detect the existence of a signal emitted by a signal source.

The direction finding unit 2 and the processing unit 3 can be integrated in a single unit or can be formed by separate units. The direction finding unit 2 is adapted to perform a direction finding. The direction finding unit 2 comprises a direction finding antenna system. The direction finding unit 2 further can comprise a direction finding converter and a digital signal processor.

Figure 2:
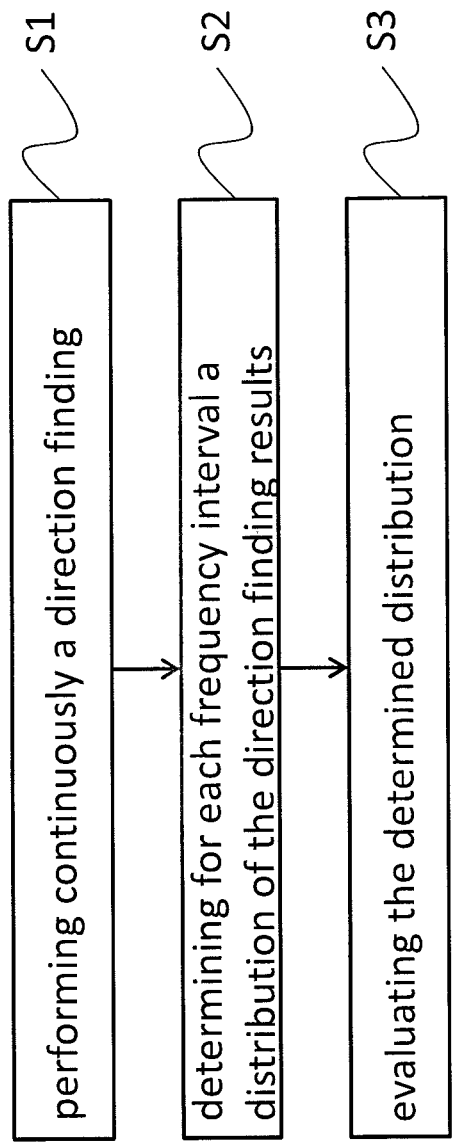
FIG. 2 shows a flowchart of a possible exemplary embodiment of a method for detection of a signal according to an aspect of the present invention.

FIG. 2 shows a flowchart of a possible embodiment of the method for detection of a signal according to the present invention comprising three main steps.

In a first step S1, a direction finding is performed continuously in time-frequency intervals $[t_i; t_j]$ $[f_k; f_l]$ within a time range and a frequency range. In a possible implementation, a predetermined frequency range $[f_{low}; f_{high}]$ to be searched is divided into a number N of frequency intervals $[f_k; f_l]$. Further, a predetermined time range $[t_{start}; t_{stop}]$ to be searched is divided into a number M of time intervals $[t_i; t_j]$. In a preferred embodiment, the frequency intervals and the time intervals are formed by equidistant intervals. For instance, the frequency range to be searched is divided into a number N of equidistant intervals wherein each interval comprises for instance a 10 MHz bandwidth. Further, the time range to be searched can be divided into a number M of equidistant intervals wherein each time interval comprises for instance a duration of 1 msec. After having divided the frequency range to be searched into a number N of frequency intervals and having divided the time range to be searched into a number M of time intervals, a direction finding is performed continuously by the direction finding unit 2 of the apparatus 1 in the time-frequency intervals $[t_i; t_j]$ $[f_k; f_l]$. In a possible implementation, the direction finding unit 2 comprises at least two antennas to detect a direction of an incoming electromagnetic signal. Using more antennas at the same time leads to a higher accuracy of detection but increases the required processing power. By selecting a higher number of antennas, a large search angle can be achieved. In a possible implementation, the received electromagnetic signal detected by each employed antenna of the direction finding unit 2 can be recorded. The direction of the signal can then be calculated from the received signals. In a possible implementation, a comparison of the received electromagnetic signals with prestored signals and corresponding direction can be performed by the direction finding unit 2. For this purpose, a search function can be used. A minimum of the search function results forms the detected direction.

In a further step S2, for each frequency interval $[f_k; f_l]$, a distribution of the direction finding results DFRs for all time intervals $[t_i; t_j]$ is determined. In a possible embodiment, for each of the number N of frequency intervals, a distribution of the M direction finding results DFRs of the number M of time intervals is determined. In a possible embodiment, a direction finding range of 360° is divided into a number B of angle intervals b. In a preferred embodiment, the angle intervals b are formed by equidistant intervals. In a possible embodiment, the range of 360° can be divided into 36 angle intervals each having a range of 10°. In this implementation, the direction finding range of 360° is divided into 36 angle intervals b each having an angle range of 10°. In a possible embodiment, the angle intervals b comprise intervals of an azimuth angle $\alpha$. In a further possible embodiment, the angle intervals b can also comprise an elevation angle $\varepsilon$ interval.

In a further step S3, the determined distribution of direction finding results DFRs is evaluated to detect the existence of a signal emitted by a signal source.

In a possible embodiment, the distribution of direction finding results DFRs can be formed by a histogram indicating for each of the number B of angle intervals b a number R of direction finding results DFRs falling into the respective angle interval b.

Figure 3:
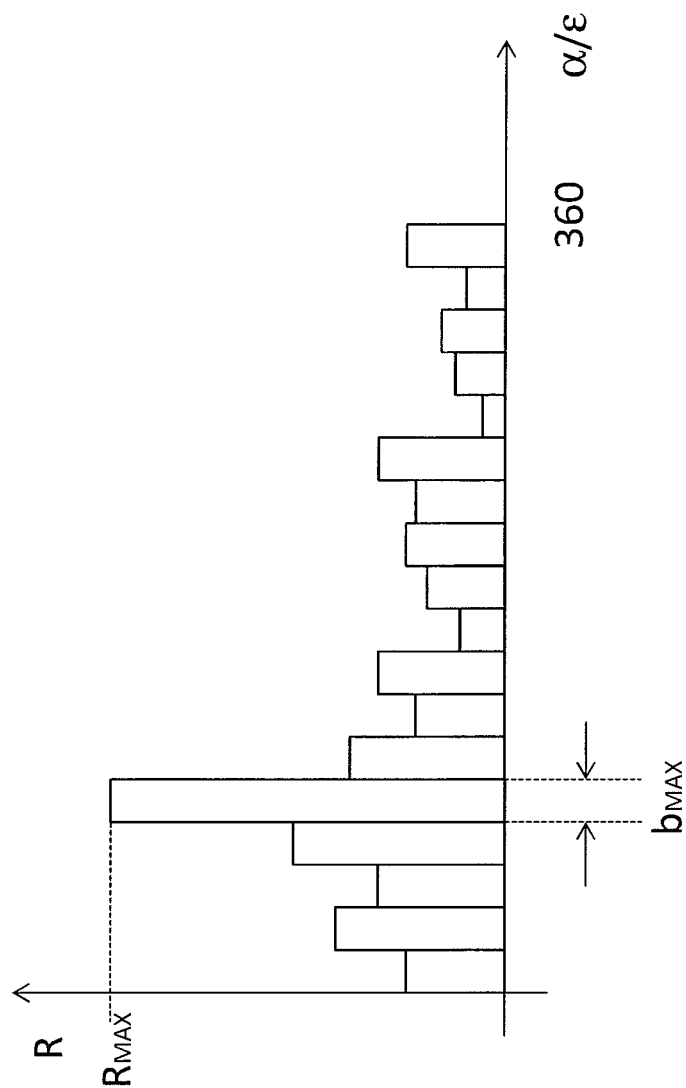
FIG. 3 shows a histogram for illustrating a possible exemplary embodiment of the method and apparatus for detection of a signal according to the present invention.

FIG. 3 illustrates such a histogram having a number of angle intervals with an associate number R of direction finding results DFRs falling into the respective angle interval b. In a possible embodiment, a specific angle interval $b_{max}$ having a maximal number $R_{MAX}$ of direction finding results DFRs falling into the specific angle interval $b_{max}$ is automatically determined by the processing unit 3. The processing unit 3 further calculates an average value A of the number of direction finding results DFRs in the remaining B−1 angle intervals b as follows:

$$A = \frac{M - R_{MAX}}{B - 1},$$

wherein M is the number of time intervals, $R_{MAX}$ is the maximum number of direction finding results falling in the angle interval having the maximal number of direction finding results, and B is the number of angle intervals b.

After having calculated the average value A, the processing unit 3 of the apparatus 1 performs in step S3 a calculation of a probability that the maximal number $R_{MAX}$ of direction finding results DFRs in the specific angle interval $b_{max}$ does not originate from noise. This is performed in a possible implementation as follows:

$$P = \frac{1 - 0,5\left(\left(\text{erf}(R_{max} - A)/\sqrt{A}/\sqrt{2}\right) + 1\right)}{B - 1}$$

wherein erf(x) is an error function of x, $R_{MAX}$ is the maximal number of direction finding results falling into a specific angle interval $b_{max}$, A is the previously calculated average value and B is the number of angle intervals b.

Finally, the processing unit 3 evaluates the calculated probability to decide whether the existence of a signal emitted by a signal is detected. The existence of a signal source emitted by a signal source is detected if the calculated probability exceeds a predetermined threshold. In a possible implementation, the existence of a signal emitted by a signal source is, for instance, detected if the calculated probability exceeds a predetermined threshold value of 99.9%. If the calculated probability exceeds the threshold value the detection of a signal is output accordingly with a detection finding angle $$\frac{(B - 0,5)}{B \times 360°}.$$

In a preferred embodiment, the direction finding unit 2 is continuously in an active operation state and performs continuously without any interruptions a direction finding in step S1. The direction finding results DFRs can be memorized or stored temporarily as histogram data to be evaluated by the processing unit 3. A maximum of direction finding results DFRs is determined and compared with the number of direction finding results DFRs in the remaining angle intervals b to decide whether the maximum number of direction finding results does originate from background noise or not. Accordingly, the processing unit 3 of the apparatus 1 performs a statistical evaluation of the histogram data in real time to detect the existence of a signal emitted by a signal source. To this end, the processing unit 3 performs the calculation of the probability of the authenticity or genuineness of the detected signals. In a possible embodiment, the processing unit can for instance calculate the probability that a detected signal has been emitted by a signal source with a specific azimuth angle and/or elevation angle with a frequency f at a time t. In a possible implementation, the evaluation results can be output by the processing unit 3 by means of a graphical user interface of the apparatus 1. Further, the evaluation results can be output by the processing unit 3 via a data interface to an external processing unit for further processing.

In a possible embodiment, if the existence of a signal emitted by a signal source is detected the determined distribution of direction finding results DFRs can be displayed on a display to a user. In a further possible embodiment, the apparatus 1 can automatically generate a warning signal if the existence of a signal emitted by a signal source has been detected. In a still further possible embodiment, the processing unit 3 can output a control signal to initiate countermeasures against the detected signal emitted by the signal source or against the signal source itself.

With the method and apparatus according to the present invention, it is possible to detect the existence of a signal emitted by a signal source even when the signal is extremely weak or is formed by a low probability of intercept signal. In a possible embodiment, the detected signal can comprise a control signal adapted to control a movable object. In a still further possible embodiment, the detected signal can comprise a radar signal adapted to detect another object.

In a possible implementation, parameters of the detection method are configurable via an interface of the apparatus 1. In a possible embodiment, the frequency range to be searched and the time range to be searched can be changed. Further, the number N of frequency intervals and the number M of time intervals can be adjusted. Also, the number B of angle intervals b can be changed depending on the application. In a still further possible embodiment, the threshold value for the calculated probability can be configured depending on the use case. In a possible embodiment, the apparatus 1 is a movable apparatus. In a further possible embodiment, the histogram data as illustrated in FIG. 3 can be registered and recorded for further evaluation. In a possible embodiment, the apparatus 1 can classify and locate transmitters of interests emitting a suspicious signal. In a possible embodiment, all located transmitter sites can be automatically displayed on an electronic map. The transmitters can in a possible implementation be colour-coded, for instance to differentiate between transmitters or signal sources of different types emitting electromagnetic signals of different types. For instance, the classified transmitters output by the processing unit 3 can differentiate between frequency hoppers, chirps, bursts and fixed frequency transmitters. In a further possible embodiment, also the probability that a signal has been detected can be colour-coded for the user. For instance, if the existence of a suspicious signal emitted by a signal source has been detected with a very high probability the corresponding transmitter or signal source can be displayed in red colour on the electronic map. If, on the other hand, the existence of a signal emitted by a signal source has only be detected with a comparatively low probability another colour for the transmitter may be used. In a possible embodiment, LPI signals with characteristic patterns can be automatically detected and classified by the processing unit 3.

What is claimed is:
1. A method for detection of a signal, the method comprising:
    performing continuously a direction finding in time-frequency intervals within a time range and a frequency range to be searched,
    wherein the direction finding comprises receiving, by at least two antennas, electromagnetic signals, and comparing, by a direction finding unit, the received elec- tromagnetic signals with prestored signals to obtain direction finding results (DFRs);

determining, by a processing unit, for each frequency interval a distribution of the DFRs, for all time intervals; and evaluating, by the processing unit, the determined distributions of DFRs, to detect the existence of a signal emitted by a signal source, wherein the evaluating the determined distribution of DFRs comprises calculating a probability that a maximum number of direction finding results does not originate from noise, and comparing the calculated probability with a predetermined threshold value, and wherein the existence of a signal from a signal source is detected, if probability exceeds the predetermined threshold value.

2. The method of claim 1, further comprising:
determining a bearing of the signal source having emitted the detected signal on the basis of the direction finding results, DFRs.

3. The method of claim 1, further comprising:
dividing the frequency range to be searched into a number, N, of frequency intervals and
dividing the time range to be searched into a number, M, of time intervals.

4. The method of claim 3, further comprising:
determining for each of the number, N, of frequency intervals a distribution of the M direction finding results, DFRs, of the number M of time intervals.

5. The method of claim 1, further comprising:
dividing a direction finding range of 360° into a number, B, of angle intervals, b.

6. The method of claim 5, wherein at least one of the frequency intervals, the time intervals and the angle intervals, b, are formed by equidistant intervals.

7. The method of claim 5, wherein the distributions of direction finding results, DFRs, are formed by a histogram indicating for each of the number B of angle intervals, b, a number, R, of direction finding results, DFRs, falling in the respective angle interval, b.

8. The method of claim 5, wherein the angle intervals b comprise intervals of an azimuth angle.

9. The method of claim 5, wherein the angle intervals b comprise intervals of an elevation angle.

10. The method of claim 5, further comprising:
determining a specific angle interval, $b_{max}$, out of the number, B, of angle intervals, b, having a maximal number, $R_{MAX}$, of direction finding results, DFRs, falling into the specific angle interval, $b_{max}$.

11. The method of claim 10, further comprising:
calculating an average value, A, of the number of direction finding results, DFRs, in the remaining, B−1, angle intervals b:

$$A = \frac{M - R_{MAX}}{B - 1}$$

12. The method of claim 11, further comprising:
calculating the probability as follows:

$$P = \frac{1 - 0,5\left(\left(\mathrm{erf}(R_{max} - A)/\sqrt{A}/\sqrt{2}\right) + 1\right)}{B - 1}$$

wherein erf(x) is the error function of x,
$R_{MAX}$ is a maximal number of direction finding results falling into a specific angle interval,
A is the calculated average value,
B is the number of angle intervals b.

13. The method of claim 1, wherein the signal comprises at least one of:
a low probability of intercept, LPI, signal,
a control signal adapted to control a movable object,
a radar signal adapted to detect an object.

14. The method of claim 1, wherein if the existence of a signal emitted by a signal source is detected the determined distribution of direction finding results is displayed to a user.

15. The method of claim 1, wherein if the existence of a signal emitted by a signal source is detected a warning signal is generated.

16. The method of claim 1, wherein if the existence of a signal emitted by a signal source is detected countermeasures against the emitted signal are initiated.

17. The method of claim 1, wherein if the existence of a signal emitted by a signal source is detected countermeasures against the signal source are initiated.

18. An apparatus for detection of a signal emitted by a signal source, said apparatus comprising:
a direction finding unit adapted to perform continuously a direction finding in time-frequency intervals within a time range and a frequency range,
the direction finding unit comprises at least two antennas for receiving electromagnetic signals, wherein the direction finding unit is adapted to compare the received electromagnetic signals with prestored signals to obtain direction finding results (DFRs); and
a processing unit being adapted to determine for each frequency interval a distribution of DFRs, for all time intervals and being adapted to evaluate the determined distributions of DFRs, to detect the existence of a signal emitted by a signal source,
wherein the processing unit is configured to calculate a probability that a maximum number of direction finding results does not originate from noise, and to compare the calculated probability with a predetermined threshold value, and
wherein the existence of a signal from a signal source is detected, if probability exceeds the predetermined threshold value.

19. The apparatus of claim 18, wherein the apparatus is configured to employ a method for detection of a signal, the method comprising: performing continuously a direction finding in time-frequency intervals within a time range and a frequency range; determining for each frequency interval a distribution of the direction finding results, DFRs, for all time intervals; and evaluating the determined distributions of direction finding results, DFRs, to detect the existence of a signal emitted by a signal source.

* * * * *